(12) United States Patent
Morihiro

(10) Patent No.: US 9,777,665 B2
(45) Date of Patent: Oct. 3, 2017

(54) INTERNAL COMBUSTION ENGINE

(71) Applicant: Toyota Jidosha Kabushiki Kaisha, Toyota-shi, Aichi-ken (JP)

(72) Inventor: Kinji Morihiro, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/843,172

(22) Filed: Sep. 2, 2015

(65) Prior Publication Data

US 2016/0069292 A1 Mar. 10, 2016

(30) Foreign Application Priority Data

Sep. 4, 2014 (JP) .................................. 2014-180227

(51) Int. Cl.
| | | |
|---|---|---|
| *F02D 41/30* | (2006.01) | |
| *F02D 41/14* | (2006.01) | |
| *F02D 41/00* | (2006.01) | |
| *F02D 41/40* | (2006.01) | |

(52) U.S. Cl.
CPC ..... *F02D 41/3094* (2013.01); *F02D 41/0085* (2013.01); *F02D 41/1454* (2013.01); *F02D 41/30* (2013.01); *F02D 41/3005* (2013.01); *F02D 41/402* (2013.01); *Y02T 10/44* (2013.01)

(58) Field of Classification Search
CPC .. F02D 41/0085; F02D 41/30; F02D 41/3005; F02D 41/3094
USPC ......................................... 123/299; 701/104
See application file for complete search history.

(56) References Cited

U.S. PATENT DOCUMENTS

| | | | | |
|---|---|---|---|---|
| 6,755,176 B2 * | 6/2004 | Takeuchi | ............ | F02D 41/0085 123/299 |
| 6,910,458 B2 * | 6/2005 | Oki | ..................... | F02D 41/0087 123/198 F |
| 6,988,490 B2 * | 1/2006 | Satou | .................... | F02B 23/104 123/299 |
| 7,467,617 B2 * | 12/2008 | Irisawa | ................. | F02D 41/008 123/295 |
| 7,933,710 B2 * | 4/2011 | Tanaka | ................ | F02D 41/1495 701/103 |

(Continued)

FOREIGN PATENT DOCUMENTS

| | | |
|---|---|---|
| JP | 2007-009815 A | 1/2007 |
| JP | 2010-053717 A | 3/2010 |

(Continued)

*Primary Examiner* — Sizo Vilakazi
*Assistant Examiner* — Kevin R Steckbauer
(74) *Attorney, Agent, or Firm* — Dinsmore & Shohl LLP

(57) ABSTRACT

An electronic control unit provided in an internal combustion engine detects a degree of inter-cylinder variation of the amount of fuel that is injected from a port injector, and a degree of inter-cylinder variation of the amount of fuel that is injected from an in-cylinder injector. In a case where the inter-cylinder variation of one of the port injector and the in-cylinder injector is equal to or greater than a predefined value, a process is executed of limiting, so as not to exceed an upper limit value, an injection proportion of the injector for which the inter-cylinder variation is equal to or greater than the predefined value. This upper limit value is set to be smaller as the degree of inter-cylinder variation of the injector, for which the inter-cylinder variation is equal to or greater than a predefined value, increases.

11 Claims, 8 Drawing Sheets

(56) References Cited

U.S. PATENT DOCUMENTS

| | | | |
|---|---|---|---|
| 8,249,794 B2* | 8/2012 | Miyamoto | F02D 41/30 701/103 |
| 8,548,718 B2* | 10/2013 | Kato | F02D 41/0085 123/479 |
| 9,043,121 B2* | 5/2015 | Kato | F02D 41/1441 123/479 |
| 2003/0164166 A1* | 9/2003 | Takeuchi | F02D 41/0085 123/674 |
| 2005/0092303 A1* | 5/2005 | Oki | F02D 41/0087 123/480 |
| 2005/0178360 A1* | 8/2005 | Satou | F02B 23/104 123/431 |
| 2005/0235960 A1* | 10/2005 | Oomori | F02D 41/008 123/431 |
| 2007/0000478 A1* | 1/2007 | Sadakane | F02D 41/38 123/431 |
| 2007/0169746 A1* | 7/2007 | Irisawa | F02D 41/008 123/431 |
| 2009/0198434 A1* | 8/2009 | Tanaka | F02D 41/1495 701/103 |
| 2012/0116651 A1* | 5/2012 | Miyamoto | F02D 41/30 701/103 |
| 2012/0247422 A1* | 10/2012 | Nagakura | F02D 41/1454 123/299 |
| 2012/0277979 A1* | 11/2012 | Kato | F02D 41/0085 701/104 |
| 2013/0226437 A1* | 8/2013 | Kato | F02D 41/1441 701/104 |
| 2014/0230792 A1* | 8/2014 | Kawabe | F02D 41/34 123/478 |
| 2015/0167575 A1* | 6/2015 | Matsumoto | F02D 41/1495 701/102 |
| 2016/0377013 A1* | 12/2016 | Yamashita | F02D 13/0269 123/480 |
| 2017/0022914 A1* | 1/2017 | Kuzuoka | F02D 19/0607 |

FOREIGN PATENT DOCUMENTS

| | | | | |
|---|---|---|---|---|
| JP | 2012-219622 A | 11/2012 | | |
| JP | 2012-233425 A | 11/2012 | | |
| JP | 2013-174133 A | 9/2013 | | |
| JP | WO 2014020393 A1 * | 2/2014 | | F02D 41/1495 |

* cited by examiner

INTERNAL COMBUSTION ENGINE

INCORPORATION BY REFERENCE

The disclosure of Japanese Patent Application No. 2014-180227 filed on Sep. 4, 2014 including the specification, drawings and abstract is incorporated herein by reference in its entirety.

BACKGROUND OF THE INVENTION

1. Field of the Invention

The invention relates to an internal combustion engine.

2. Description of Related Art

In internal combustion engines, air-fuel ratio control is performed that involves correcting a fuel injection amount in such a manner that an actual air-fuel ratio becomes a target air-fuel ratio. In an internal combustion engine provided with a plurality of cylinders, as disclosed in Japanese Patent Application Publication No. 2012-233425 (JP 2012-233425 A), variation in the air-fuel ratio among cylinders occurs, and emissions become worse, when a fuel injection amount varies among the cylinders; accordingly, there is determined the presence or absence of a variation in the air-fuel ratio among the cylinders.

Internal combustion engines that are provided with an intake port fuel injection valve that injects fuel to an intake port, and with an in-cylinder fuel injection valve that injects fuel directly into a fuel combustion chamber, are likewise available. In such internal combustion engines, as conventionally available, the performance of the internal combustion engine is enhanced through execution of split injection of fuel, by modifying, in accordance with an engine operating state, an injection proportion of fuel that is injected through each fuel injection valve. For instance, the performance of the internal combustion engine, in terms of suppressing oil dilution by fuel and suppressing the formation of soot in the fuel combustion chamber, is enhanced by increasing the proportion of fuel that is injected through the intake port fuel injection valve, and by reducing the proportion of fuel that is injected through the in-cylinder fuel injection valve. By conversely reducing the proportion of fuel that is injected through the intake port fuel injection valve and increasing the proportion of fuel that is injected through the in-cylinder fuel injection valve, the amount of fuel that vaporizes inside the fuel combustion chamber increases, and the intake temperature drops as a result. The performance of the internal combustion engine is accordingly enhanced in that, for instance, anti-knocking performance and filling efficiency of the intake are enhanced as a result.

For instance, JP 2012-233425 A discloses a feature wherein variation in the air-fuel ratio among cylinders occurs in such an internal combustion engine, there is determined whether this variation is caused by variation in the amount of fuel that is injected through each intake port fuel injection valve, or variation in the amount of fuel that is injected through each in-cylinder fuel injection valve. Further, JP 2012-233425 A discloses the feature of prohibiting the use of the fuel injection valve that is the cause of variation in the air-fuel ratio, to curtail thereby worsening of emissions derived from variation in the air-fuel ratio among cylinders.

An optimal value in terms of enhancing the performance of the internal combustion engine is set herein as the injection proportion at the time of execution of the above-described split injection. When prohibiting the use of the fuel injection valve due to which the fuel injection amount varies among cylinders, therefore, it becomes possible to suppress worsening of emissions derived from variation in the air-fuel ratio, which is caused in turn by variation in the fuel injection amount, however, the injection proportion of fuel can no longer be optimized. Accordingly, the effect of enhancing the performance of the internal combustion engine through split injection of fuel, such as the above-described one, is impaired.

SUMMARY OF THE INVENTION

In the light of the above circumstances, it is an object of the invention to provide an internal combustion engine that allows suppressing, as much as possible, decline in the effect elicited by split injection of fuel by an intake port fuel injection valve and an in-cylinder fuel injection valve, at a time where split injection of fuel is being executed by the intake port fuel injection valve and the in-cylinder fuel injection valve, while suppressing worsening of emissions caused by variation in the fuel injection amount among cylinders in the internal combustion engine.

Therefore, an aspect of the invention provides an internal combustion engine that has an intake port fuel injection valve, an in-cylinder fuel injection valve and an electronic control unit. The intake port fuel injection valve is provided in each of a plurality of cylinders of the internal combustion engine. The intake port fuel injection valve is configured to inject fuel into an intake port of the internal combustion engine. The in-cylinder fuel injection valve is provided in each of the plurality of cylinders of the internal combustion engine. The in-cylinder fuel injection valve is configured to inject fuel into a fuel combustion chamber of the internal combustion engine. The electronic control unit is configured to: (i) perform split injection of fuel by the intake port fuel injection valve and the in-cylinder fuel injection valve by modifying, in accordance with an engine operating state, an injection proportion of fuel that is injected through each of the intake port fuel injection valve and the in-cylinder fuel injection valve, (ii) detect a degree of inter-cylinder variation in an amount of fuel injected through the intake port fuel injection valve and a degree of inter-cylinder variation in an amount of fuel that is injected through the in-cylinder fuel injection valve, (iii) determine, in a case where one of the degree of inter-cylinder variation detected for the intake port fuel injection valve and the degree of inter-cylinder variation detected for the in-cylinder fuel injection valve is equal to or greater than a predefined value, the one of the intake port fuel injection valve and the in-cylinder fuel injection valve, for which determination has been made that the degree of inter-cylinder variation is equal to or greater than the predefined value as, a target injection valve, (iv) set a target injection proportion of the target injection valve to be smaller as the degree of inter-cylinder variation of the target injection valve increases, (v) set each injection proportion of fuel from each of the intake port fuel injection valve and the in-cylinder fuel injection valve, based on the target injection proportion set for the target injection valve, and (vi) execute split injection of fuel from each of the intake port fuel injection valve and the in-cylinder fuel injection valve, based on each injection proportion that has been set.

According to an internal combustion engine configuration such as the above, the amount of fuel that is injected through the fuel injection valve (the target injection valve above) for which the degree of inter-cylinder variation in fuel injection amount is equal to or greater than a predefined value, from among the intake port fuel injection valve and the in-cylinder fuel injection valve, is reduced as the degree of inter-cylinder variation increases. Therefore, the variation in the fuel injection amount among cylinders decreases, and, as a result, there is suppressed worsening of emissions derived from variation in the fuel injection amount among cylinders.

According to this configuration, although the injection proportion of the fuel injection valve for which the degree of inter-cylinder variation is equal to or greater than the predefined value is reduced in accordance with the degree of inter-cylinder variation, large deviations from an original request of split injection of fuel are further suppressed, as compared with an instance where the use of the fuel injection valve is prohibited. It becomes therefore possible to curtail, as much as possible, decline in the effect of split injection at a time where there is executed split injection of fuel by the intake port fuel injection valve and the in-cylinder fuel injection valve.

In this configuration there is modified not the injection amount itself of the fuel injection valve for which the degree of inter-cylinder variation is equal to or greater than the predefined value, but the injection proportion. Therefore, the fuel injection amount of the other fuel injection valve that performs split injection along with the fuel injection valve, is increased in a case where the fuel injection amount injected of the fuel injection valve is reduced. The total amount of fuel that is supplied to the cylinders is maintained as a result, without change.

In the internal combustion engine, the electronic control unit may be configured to (i) limit the target injection proportion of the target injection valve so as not to exceed an upper limit value, and (ii) set the upper limit value to a smaller value as the degree of inter-cylinder variation of the target injection valve increases.

The greater the amount of fuel that is injected through the fuel injection valve for which the degree of inter-cylinder variation is equal to or greater than the predefined value, the greater is the influence of inter-cylinder variation on exhaust emissions. Conversely, when the amount of fuel injected through that fuel injection valve is small, the influence exerted by the inter-cylinder variation on exhaust emissions is likewise small. To satisfy the original request of split injection of fuel, in the fuel injection control of the internal combustion engine, it is therefore preferable to reduce the amount of fuel that is injected through the fuel injection valve for which the degree of inter-cylinder variation is equal to or greater than the predefined value, only when the amount of fuel that is injected through the fuel injection valve is comparatively large.

According to the configuration of the internal combustion engine, therefore, a process is executed of limiting, so as not to exceed the upper limit value, the target injection proportion of the target fuel injection valve for which the degree of inter-cylinder variation is equal to or greater than the predefined value. As a result it becomes possible to suppress injection of a significant amount of fuel, through the fuel injection valve for which the degree of inter-cylinder variation is equal to or greater than the predefined value. In this configuration, the greater is the degree of inter-cylinder variation of the fuel injection valve for which the degree of inter-cylinder variation is equal to or greater than the predefined value, the smaller is the value to which the upper limit value is set. Accordingly, it becomes possible to make the target injection proportion of the target fuel injection valve smaller as the degree of inter-cylinder variation of the fuel injection valve, for which the degree of inter-cylinder variation is equal to or greater than the predefined value, increases.

In the internal combustion engine, the electronic control unit may be configured to (i) limit the injection proportion of the other one of the intake port fuel injection valve and the in-cylinder fuel injection valve that performs split injection along with the target injection valve, so as not to fall below a lower limit value, and (ii) set the lower limit value to a greater value as the degree of inter-cylinder variation of the target injection valve.

In a case where the lower limit value of the injection proportion of the "other one of the fuel injection valves, which that performs split injection along with the fuel injection value, for which the degree of inter-cylinder variation is equal to or greater than the predefined value, is limited so as not to fall below a lower limit value, for example, in a case where the lower limit value of the injection proportion of the "other one of the fuel injection valves" is set to "10%", there is a possibility that the target injection proportion of the "that target fuel injection valve for which the degree of inter-cylinder variation is equal to or greater than the predefined value" is set to "90%" at most. This brings about a state identical to that of an instance where the upper limit value of the target injection proportion of the "target fuel injection valve for which the degree of inter-cylinder variation is equal to or greater than the predefined value" is set to "90%". There is also a possibility that, in a case where the lower limit value of the injection proportion of the "other one of the fuel injection valves" is set to "20%", which is greater than "10%", the target injection proportion of the "target fuel injection valve for which the degree of inter-cylinder variation is equal to or greater than the predefined value" is set to "80%" at most. This brings about a state identical to that of an instance where the upper limit value of the target injection proportion of the "target fuel injection valve for which the degree of inter-cylinder variation is equal to or greater than the predefined value" is set to be small. In a case of limiting, so as not to fall below a lower limit value, the injection proportion of the other one of the fuel injection valves that performs split injection along with the target fuel injection valve for which the degree of inter-cylinder variation is equal to or greater than the predefined value, increasing thus that lower limit value elicits an effect identical to that elicited by reducing the upper limit value for the target injection proportion of the target fuel injection valve for which the degree of inter-cylinder variation is equal to or greater than the predefined value.

Therefore, in this configuration there is executed a process of limiting, so as not to fall below a lower limit value, the injection proportion of the other one of the fuel injection valves that performs split injection along with the fuel injection valve for which the degree of inter-cylinder variation is equal to or greater than the predefined value. Further, the greater the degree of inter-cylinder variation of the target fuel injection valve for which the degree of inter-cylinder variation is equal to or greater than the predefined value, the greater is the value to which the lower limit value is set. Therefore, this configuration as well allows eliciting the same effect as that of the configuration "execute a process of limiting, so as not to exceed an upper limit value, the injection proportion of the target fuel injection valve for which the degree of inter-cylinder variation is equal to or greater than the predefined value, and set the upper limit value to a smaller value as the degree of inter-cylinder variation of the target fuel injection valve, for which the degree of inter-cylinder variation is equal to or greater than the predefined value, increases" described above. That is, it becomes possible to suppress injection of a significant amount of fuel through the fuel injection valve for which the degree of inter-cylinder variation is equal to or greater than the predefined value, and to make smaller the target injection proportion of the target fuel injection valve as the degree of inter-cylinder variation of the target fuel injection valve, for which the degree of inter-cylinder variation is equal to or greater than the predefined value, increases.

In fuel injection control in the internal combustion engine, the electronic control unit may be configured to execute downward correction of making the target injection proportion of the target injection valve smaller as the degree of inter-cylinder variation of the target injection valve increases, without limiting the target injection proportion of the target injection valve so as not to exceed an upper limit value. Herein, the electronic control unit may be configured to execute the downward correction by multiplying the target injection proportion of the target injection valve by a downward correction value. Accordingly, the electronic control unit may be configured to execute by subtracting a subtraction value from the target injection proportion of the target injection valve. By virtue of such fuel injection control of the internal combustion engine as well, it becomes possible to make the target injection proportion of the target fuel injection valve smaller as the degree of inter-cylinder variation of the fuel injection valve, for which the degree of inter-cylinder variation is equal to or greater than the predefined value, increases.

In fuel injection control in the internal combustion engine, the electronic control unit is configured to execute upward correction of making greater the injection proportion of the other one of the intake port fuel injection valve and the in-cylinder fuel injection valve that performs split injection along with the target injection valve as the degree of inter-cylinder variation of the target injection valve increases, without limiting the injection proportion of the other one of the intake port fuel injection valve and the in-cylinder fuel injection valve so as not to fall below a lower limit value. In this case, the electronic control unit may be configured to execute the upward correction by multiplying the injection proportion of the other one of the intake port fuel injection valve and the in-cylinder fuel injection valve by an upward correction value. Alternatively, the electronic control unit may be configured to execute the upward correction by adding an increment to the injection proportion of the other one of the intake port fuel injection valve and the in-cylinder fuel injection valve.

When performing split injection of fuel by the intake port fuel injection valve and the in-cylinder fuel injection valve, increasing the injection proportion of one of the intake port fuel injection valve and the in-cylinder fuel injection valve is synonymous with reducing the injection proportion of the other one of the intake port fuel injection valve and the in-cylinder fuel injection valve. Therefore, by making greater the injection proportion of the other one of the intake port fuel injection valve and the in-cylinder fuel injection valve, which performs split injection along with the target fuel injection valve for which the degree of inter-cylinder variation is equal to or greater than the predefined value, as the degree of inter-cylinder variation of the fuel injection valve (the above target injection valve) for which the degree of inter-cylinder variation is equal to or greater than the predefined value increases, it becomes possible to make the target injection proportion of the target fuel injection valve smaller as the degree of inter-cylinder variation of the target fuel injection valve, for which the degree of inter-cylinder variation is equal to or greater than the predefined value, increases as in the configuration of the internal combustion engine described above.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the internal combustion engine of the invention will be explained next with reference to FIG. 1 to FIG. 5. The internal combustion engine is a so-called multi-cylinder internal combustion engine provided with a plurality of cylinders and in which fuel injection control is executed.

Figure 1:
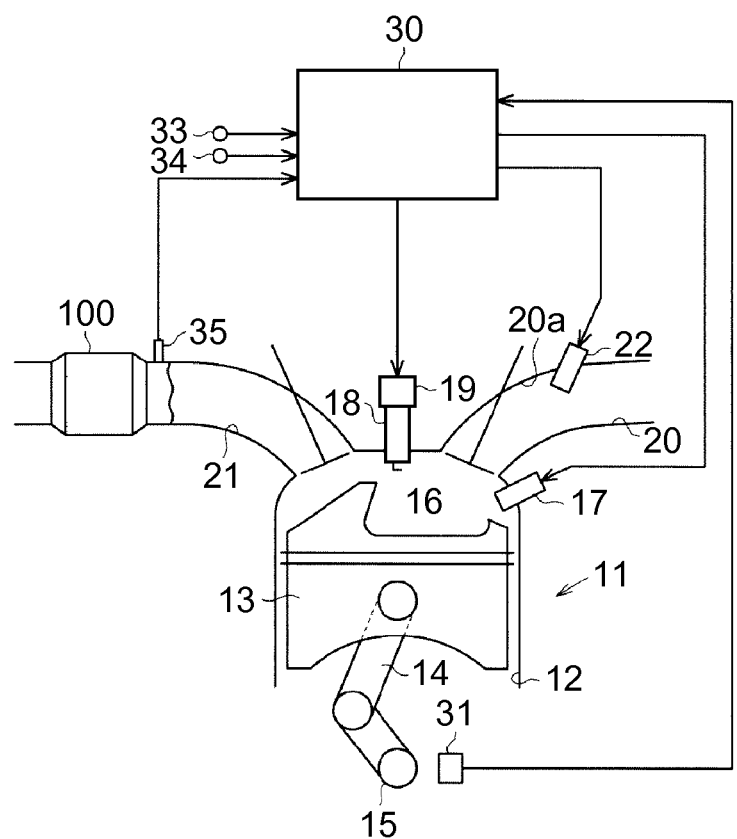
FIG. 1 is a schematic diagram illustrating the structure of an internal combustion engine according to an embodiment of the invention.

As illustrated in FIG. 1, a piston 13 is provided in each cylinder 12 of an internal combustion engine 11. The piston 13 is connected, via a connecting rod 14, to a crankshaft 15 that is an output shaft of the internal combustion engine 11. The reciprocating motion of the piston 13 is converted, by the connecting rod 14, to rotary motion of the crankshaft 15.

A fuel combustion chamber 16 is defined and formed above the piston 13, inside each cylinder 12, and an in-cylinder injector 17 (in-cylinder fuel injection valve) is provided that injects fuel into the fuel combustion chamber 16. The in-cylinder injector 17 supplies predefined high-pressure fuel by way of a conventional fuel supply mechanism. Through driving of the in-cylinder injector 17 so as to open, so-called in-cylinder injection is carried out in that fuel is supplied by being directly injected into the fuel combustion chamber 16.

The fuel combustion chamber 16 has mounted thereon an ignition plug 18 that ignites an air-fuel mixture, made up of fuel and air, that is formed inside the fuel combustion chamber 16. The ignition timing of the air-fuel mixture by the ignition plug 18 is adjusted by an igniter 19 that is provided at the top of the ignition plug 18.

An intake passage 20 and an exhaust passage 21 communicate with the fuel combustion chamber 16. An intake port 20a that makes up part of the intake passage 20 is provided with a port injector 22 (intake port fuel injection valve) that injects fuel into the intake port 20a. Fuel at a predefined pressure is supplied, by way of a conventional mechanism, to the port injector 22. Herein, so-called port injection is carried out in which fuel is injected into the intake port 20a accompanying opening-driving of the port injector 22. A throttle valve that doses the amount of air that is introduced into the fuel combustion chamber 16 is also provided in the intake passage 20.

An exhaust gas control apparatus 100, which fulfils a purifying function when the air-fuel ratio of the air-fuel mixture takes on a value lying within a predefined range, is provided downstream of the exhaust passage 21. A control device 30 (an electronic control unit) performs various control items of the internal combustion engine 11. The control device 30 is provided, for instance, with a central processing unit (CPU) that performs various processes pertaining to engine control, a memory that stores control programs and information necessary for engine control, driving circuits of the in-cylinder injector 17 and port injector 22, and driving circuits of the igniter 19 and so forth.

Various sensors that detect the engine operating state are connected to the control device 30. For instance, the crank angle of the crankshaft 15 is detected by a crank sensor 31, and an engine rotational speed NE is calculated based on the crank angle. An accelerator operation amount ACCP is detected by an accelerator sensor 33. An intake air amount GA is detected by an air flow meter 34. An air-fuel ratio AFr is detected by an air-fuel ratio sensor 35 that is provided on the exhaust upstream side of the exhaust gas control apparatus 100. The control device 30 performs various control items that include, for instance, fuel injection control, air-fuel ratio control and ignition timing control, in accordance with the operating state of the internal combustion engine 11 as grasped based on detected signals from the various sensors above.

Figure 2:
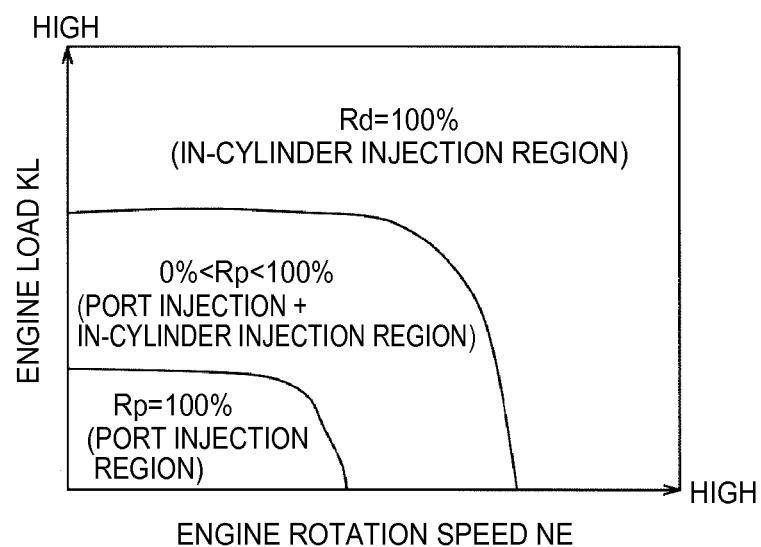
FIG. 2 is a conceptual diagram of a split injection region of the internal combustion engine, where the horizontal axis represents engine rotational speed and the vertical axis represents engine load.

For instance, the control device 30 performs split injection of fuel, by the in-cylinder injector 17 and the port injector 22, to increase thereby the performance of the internal combustion engine 11. As illustrated in FIG. 2, for instance, 100% port injection is performed, using only the port injector 22, in a low-rotation low-load region, while port injection and in-cylinder injection are performed using both the port injector 22 and the in-cylinder injector 17, in a medium-load medium-rotation region. Further, 100% in-cylinder injection using the in-cylinder injector 17 alone is performed in a high-load high-rotation region. The split injection region illustrated in FIG. 2 is an example, and can be modified as appropriate.

The effects elicited through such split injection of fuel include, for instance, the following. Firstly, by increasing the proportion of fuel injected through the port injector 22 and reducing the proportion of fuel injected through the in-cylinder injector 17, the performance of the internal combustion engine 11 is enhanced in that, for instance, oil dilution by fuel is suppressed, and generation of soot in the fuel combustion chamber 16 is likewise suppressed. Conversely, by reducing the proportion of fuel injected through the port injector 22 and increasing the proportion of fuel injected through the in-cylinder injector 17, the amount of fuel that vaporizes inside the fuel combustion chamber 16 increases and the intake temperature drops. The performance of the internal combustion engine 11 is accordingly enhanced in that, for instance, anti-knocking performance and filling efficiency of the intake are enhanced as a result.

The split injection of fuel described above is executed by modifying, in various ways, a port injection proportion Rp that denotes the proportion between the amount of fuel that is injected through the port injector 22, within a fuel injection amount Q that is set based on the engine operating state.

The port injection proportion Rp is variably set within the range "0%≤Rp≤100%", based on engine operating state in terms of, for instance, engine load KL and engine rotational speed NE. A fuel amount that reflects the port injection proportion Rp with respect to the fuel injection amount Q is set as the fuel injection amount of the port injector 22. A value resulting from subtracting the port injection proportion Rp from "100%" is calculated (Rd=100%−Rp) as an in-cylinder injection proportion Rd that denotes the proportion of the amount of fuel that is injected through the in-cylinder injector 17, within the fuel injection amount Q. A fuel amount that reflects the in-cylinder injection proportion Rd with respect to the fuel injection amount Q is set as the fuel injection amount of the in-cylinder injector 17.

In the case of the example illustrated in FIG. 2 above, the port injection proportion Rp is set to "100%" and the in-cylinder injection proportion Rd is set to "0%" in the low-load low-rotation region. In the medium-load medium-rotation region, the port injection proportion Rp is variably set within the range "0%<Rp<100%", and the in-cylinder injection proportion Rd as well is variably set in accordance therewith. In the high-load high-rotation region, the port injection proportion Rp is set to "0%", and the in-cylinder injection proportion Rd is set to "100%". In the embodiment, thus, the in-cylinder injection proportion Rd as well is variably set, as a matter of course, through variable setting of the port injection proportion Rp in accordance with the engine operating state.

The control device 30 monitors whether variation in the air-fuel ratio occurs or not among the cylinders of the internal combustion engine 11. More specifically, variation in fuel injection amounts among cylinders is one cause of variation in the air-fuel ratio. The control device 30 grasps thus an imbalance ratio IMB, which is an indicator denoting such inter-cylinder variation in fuel injection amount.

Figure 3:
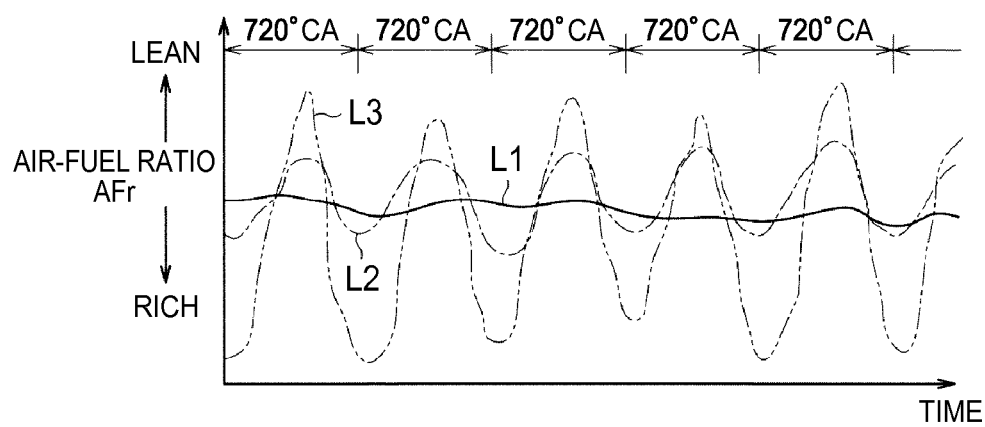
FIG. 3 is a time chart illustrating the change over time of air-fuel ratio fluctuation according to a degree of inter-cylinder variation in the internal combustion engine.

FIG. 3 illustrates the fluctuation in air-fuel ratio for each cycle (720° CA) of one round of combustion in all cylinders of a four-cylinder engine. In particular, FIG. 3 illustrates the manner in which the air-fuel ratio AFr detected by the air-fuel ratio sensor 35 fluctuates in a case where inter-cylinder variation in the fuel injection amount is generated through deliberate offsetting of the fuel injection amount in a given cylinder. The solid line L1 illustrated in FIG. 3 denotes the fluctuation of the air-fuel ratio AFr at a time where no inter-cylinder variation occurs. The chain line L2 denotes the fluctuation of the air-fuel ratio AFr at a time where inter-cylinder variation has been generated through offsetting of the fuel injection amount of a given cylinder by a predefined amount Al. The two-dot chain line L3 denotes the fluctuation of the air-fuel ratio AFr at a time where inter-cylinder variation has been generated through offsetting of the fuel injection amount of a given cylinder by a predefined amount A2 that is greater than the predefined amount A1 above.

As denoted by the solid line L1 in FIG. 3, the periodic fluctuation in the air-fuel ratio AFr is repeated, with one cycle of the internal combustion engine 11 as one fluctuation period. As denoted by the chain line L2, a variation amount of the air-fuel ratio AFr within one cycle increases when a difference in air-fuel ratio among cylinders arises due to the occurrence of inter-cylinder variation in the fuel injection amount. As the chain line L2 and two-dot chain line L3 illustrate, the greater the offset of the fuel injection amount among cylinders, i.e. the greater the degree of inter-cylinder variation in the fuel injection amount, the greater is the variation amount of the air-fuel ratio AFr.

In the embodiment, therefore, the imbalance ratio IMB that denotes the degree of inter-cylinder variation is detected based on a value that is correlated with the variation amount of the air-fuel ratio AFr (for instance, the magnitude of the slope of the signal output by the air-fuel ratio sensor 35, the rate of change of the air-fuel ratio AFr, or the amount of change of the air-fuel ratio AFr within a predefined period). More specifically, a value relating to the variation amount of the air-fuel ratio AFr, such as the above-described one, is detected, such that the greater the variation amount based on the detected value, the greater is the value that the imbalance ratio IMB takes on.

In order to increase the precision of the imbalance ratio IMB in the embodiment, detection of the imbalance ratio IMB is executed a plurality of times, in an operating state that excludes sudden acceleration and deceleration, and the detected plurality of imbalance ratios IMB is averaged, to calculate a final imbalance ratio IMB. Calculation of a final imbalance ratio IMB through such averaging is herein an example, and the final imbalance ratio IMB may be calculated in some other manner.

The internal combustion engine 11 of the embodiment is provided with the port injector 22 and the in-cylinder injector 17. As the imbalance ratio IMB there are detected, accordingly, a port imbalance ratio IMBp that denotes the degree of inter-cylinder variation in the fuel amount injected through the port injector 22, and an in-cylinder imbalance ratio IMBd that denotes the degree of inter-cylinder variation in the fuel amount injected through the in-cylinder injector 17. Preferably, the port imbalance ratio IMBp is detected when 100% port injection is being carried out. At a time where port injection and in-cylinder injection are resorted to concomitantly, for instance, the port imbalance ratio IMBp can be detected by correcting the imbalance ratio IMB, detected at such time, in accordance with the port injection proportion Rp. Likewise, the in-cylinder imbalance ratio IMBd is preferably detected when 100% in-cylinder injection is carried out. At a time where port injection and in-cylinder injection are resorted to concomitantly, the in-cylinder imbalance ratio IMBd can be detected by correcting the imbalance ratio IMB, detected at that time, in accordance with the in-cylinder injection proportion Rd.

Technologies for detecting such degree of inter-cylinder variation are available. For instance, besides the variation amount of the air-fuel ratio AFr described above, with increasing degree of inter-cylinder variation, the greater is the rotational variation of the internal combustion engine. It is likewise a conventional feature in which the richer the air-fuel ratio of some cylinders is set to be with respect to the air-fuel ratio in other cylinders, the higher is the concentration of hydrogen that is discharged from the cylinders. It is also conventional feature in which when the hydrogen concentration increases thus, the sensor that detects the air-fuel ratio ends up detecting hydrogen, and the output value of the sensor becomes offset to a richer ratio as compared with an output value according to the actual air-fuel ratio. Therefore, the above conventional features may be exploited to detect the degree of inter-cylinder variation relating to the fuel injection amount.

In a case where the inter-cylinder variation described above occurs in the port injector 22, the control device 30 executes an injection proportion reducing process of making the port injection proportion Rp smaller as the degree of inter-cylinder variation of the amount of fuel that is injected through the port injector 22 increases. More specifically, the injection proportion reducing process involves executing a process of limiting the port injection proportion Rp so as not to exceed a port upper limit value Ap, and setting the port upper limit value Ap to a smaller value as the degree of inter-cylinder variation increases.

Figure 4:
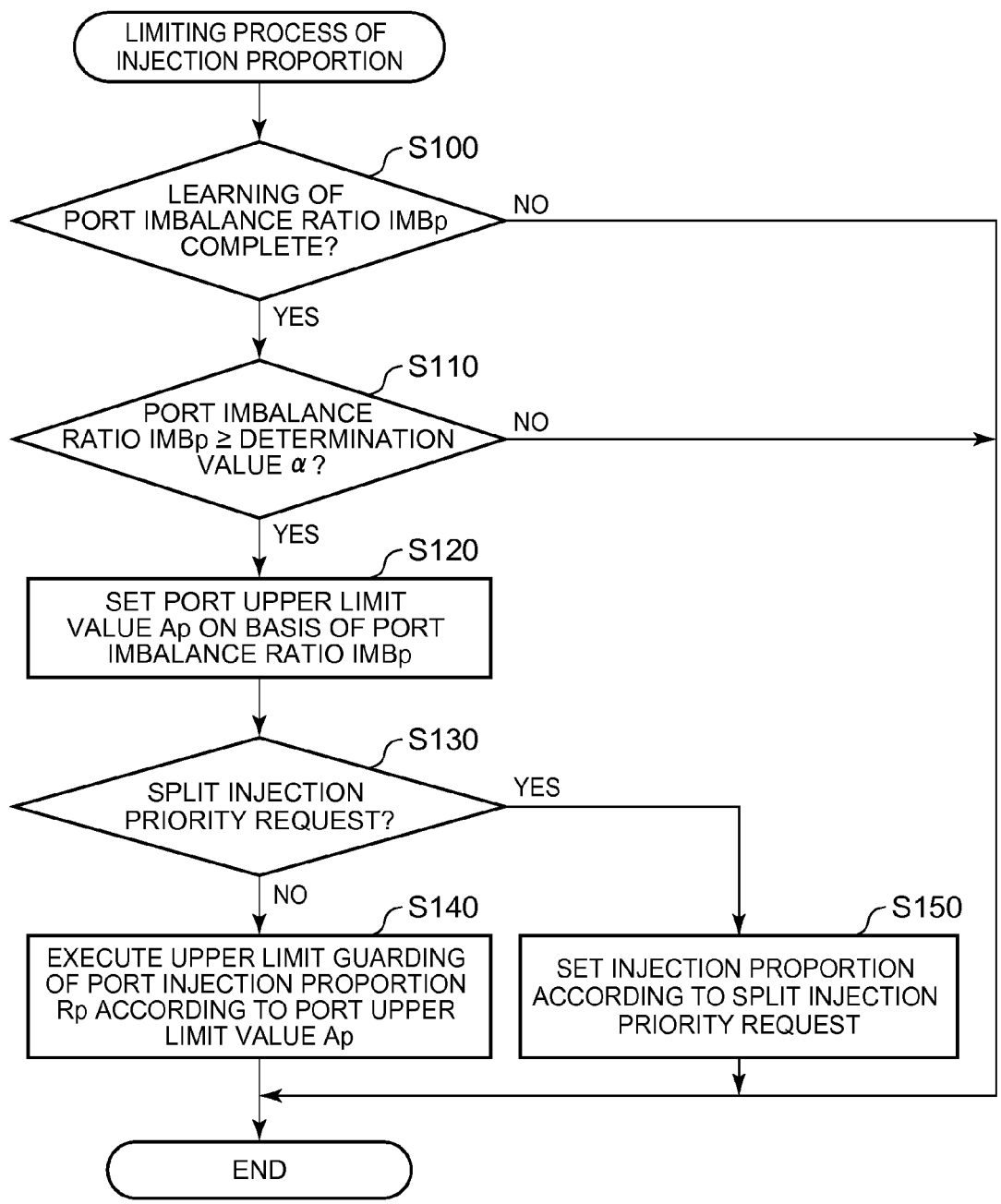
FIG. 4 is a flowchart illustrating a procedure of a limiting process of an injection proportion of a port injector in a first embodiment of the invention.

Such limiting process of the injection proportion will be explained next with reference to FIG. 4 and FIG. 5 of the first embodiment of the invention. This process is repeatedly executed, by the control device 30, every predefined cycle. As illustrated in FIG. 4, when the process is initiated, it is determined first whether learning of the port imbalance ratio IMBp is complete or not (S100). Herein, learning of the port imbalance ratio IMBp being complete refers to a state in which averaging of the port imbalance ratio IMBp detected over multiple times is complete.

When learning of the port imbalance ratio IMBp is not complete (NO in S100), the process is terminated temporarily. On the other hand, when learning of the port imbalance ratio IMBp is complete (YES in S100), it is determined whether the port imbalance ratio IMBp is equal to or greater than a determination value α or not (S110). As the determination value α there is set a port imbalance ratio IMBp of a time at which the inter-cylinder variation for the amount of fuel that is injected through the port injector 22 is large enough to influence exhaust emissions.

When the port imbalance ratio IMBp is smaller than the determination value α (NO in S110), it is determined that the inter-cylinder variation of the port injector 22 is not problematic, and the process is temporarily terminated.

On the other hand, when the port imbalance ratio IMBp is equal to or greater than the determination value α (YES in S110), it is determined that the inter-cylinder variation for the port injector 22 has become large to a certain extent. In the first embodiment, the port injector 22 for which it is determined that the port imbalance ratio IMBp is equal to or greater than the determination value α corresponds to the target injection valve above.

Next, the port upper limit value Ap is set based on the learned port imbalance ratio IMBp (S120). The port upper limit value Ap is a value that is used when executing upper limit guarding of the port injection proportion Rp. When the port injection proportion Rp set based on engine operating state exceeds the port upper limit value Ap, the value of the port injection proportion Rp is modified to the value of the port upper limit value Ap.

Figure 5:
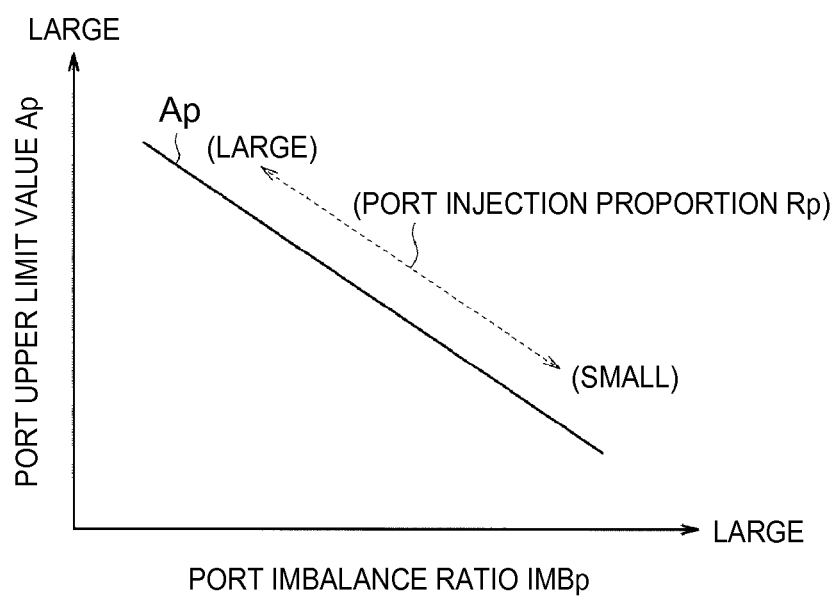
FIG. 5 is a graph illustrating the relationship between a port imbalance ratio and a port upper limit value in the first embodiment.

As illustrated in FIG. 5, the port upper limit value Ap is variably set in accordance with the value of the port imbalance ratio IMBp in such a manner that the greater the port imbalance ratio IMBp, the smaller is the value of the port upper limit value Ap.

Next it is determined whether there is a split injection priority request or not (S130). The term split injection priority request is a request of modifying, to a prescribed value established beforehand, the injection proportion of the port injector 22 and the in-cylinder injector 17, with priority over other processes, in order to perform, for instance, detection of various anomalies.

When there is no split injection priority request (NO in S130), there is executed the above-described upper limit guarding of the port injection proportion Rp according to the port upper limit value Ap (S140), and the process is terminated temporarily.

On the other hand, when there is a split injection priority request (YES in S130), an injection proportion according to the split injection priority request is set, without executing upper limit guarding of the port injection proportion Rp according to the port upper limit value Ap (S150), and the process is terminated temporarily.

The effect of the above limiting process will be explained next. When the port imbalance ratio IMBp is equal to or greater than the determination value α, the larger the amount of fuel that is injected through the port injector 22, the greater is the influence of inter-cylinder variation on exhaust emissions. Conversely, the influence exerted by the inter-cylinder variation on exhaust emissions is likewise small for a small amount of fuel injected through the port injector 22 for which the port imbalance ratio IMBp is equal to or greater than the determination value α. To satisfy the original request of split injection of fuel in a case where the port imbalance ratio IMBp is equal to or greater than the determination value α, therefore, it is preferable to reduce the fuel injection amount injected through the port injector 22 only when the fuel injection amount injected through the port injector 22 is comparatively large.

Therefore, in a case where in the above limiting process the port imbalance ratio IMBp is equal to or greater than the determination value α, a process is executed, in step S140, of limiting the injection proportion of the port injector 22 so as not to exceed the port upper limit value Ap. As a result it becomes possible to suppress injection of a significant amount of fuel through the port injector 22 for which the inter-cylinder variation is equal to or greater than the determination value α.

As illustrated in FIG. 5, the port upper limit value Ap is set in step S120 to a smaller value as a port imbalance ratio IMBp increases. Accordingly, the smaller is the value to which the port upper limit value Ap is set, the more readily the upper limit of the port injection proportion Rp is guarded according to the port upper limit value Ap, and the smaller is also the value of the port injection proportion Rp having had the upper limit thereof guarded, as illustrated in FIG. 5. Therefore, the greater the port imbalance ratio IMBp that denotes the degree of inter-cylinder variation of the port injector 22, the smaller is the port injection proportion Rp, and the smaller is the amount of fuel injected through the port injector 22 for which the port imbalance ratio IMBp is equal to or greater than the determination value α.

Thus, in a case where the port imbalance ratio IMBp is equal to or greater than the determination value α, the amount of fuel that is injected through the port injector 22 is made smaller as the degree of inter-cylinder variation increases. Therefore, the variation in the fuel injection amount among cylinders decreases, and, as a result, there is suppressed worsening of emissions derived from variation in the fuel injection amount among cylinders.

Although the injection proportion of the port injector 22 for which inter-cylinder variation occurs is reduced in accordance with the degree of inter-cylinder variation, fuel injection itself through the port injector 22 is not prohibited. As a result, large deviations from the original request of split injection of fuel are further suppressed, as compared with an instance where there is prohibited the use itself of the port injector 22 for which inter-cylinder variation occurs. It becomes therefore possible to curtail, as much as possible, decline in the effect elicited by split injection of fuel.

In the first embodiment there is modified not the fuel injection amount itself of the port injector 22, but the injection proportion. Therefore, the amount of fuel injected through the in-cylinder injector 17, which performs split injection along with the port injector 22, increases when the fuel injection amount injected through the port injector 22 is reduced. The total amount of fuel that is supplied to the cylinders is maintained as a result, without change.

As explained above, the first embodiment elicits the following effects. (1) In a case where the port imbalance ratio IMBp that denotes the degree of inter-cylinder variation of the port injector 22 is equal to or greater than the determination value α and exhaust emissions are influenced by inter-cylinder variation, the port injection proportion Rp is set to be smaller as the port imbalance ratio IMBp increases. Therefore, the variation in the fuel injection amount among cylinders decreases, and, as a result, there is suppressed worsening of emissions derived from variation in the fuel injection amount among cylinders. Further, large deviations from the original request of split injection of fuel are further suppressed, as compared with an instance where the use of the port injector 22 is prohibited. It becomes therefore possible to curtail, as much as possible, decline in the effect of split injection at a time of execution of split injection of fuel by the port injector 22 and the in-cylinder injector 17.

(2) In a case where the port imbalance ratio IMBp is equal to or greater than the determination value α there is executed the upper limit guarding process of limiting the injection proportion of the port injector 22 so as not to exceed the port upper limit value Ap. It becomes therefore possible to suppress adverse occurrences, such as worsening of exhaust emissions, through injection of a significant amount of fuel through the port injector 22 for which the port imbalance ratio IMBp is equal to or greater than the determination value α. The greater the port imbalance ratio IMBp, the smaller is the value to which the port upper limit value Ap is set. It becomes therefore possible to make the port injection proportion Rp smaller as the degree of inter-cylinder variation of the port injector 22 increases.

A second embodiment of the internal combustion engine of the invention will be explained next with reference to FIG. 6 to FIG. 7.

In the first embodiment, an injection proportion reducing process has been explained for an instance where the cause of inter-cylinder variation is the port injector 22. In the second embodiment, by contrast, there is executed an injection proportion reducing process of reducing the in-cylinder injection proportion Rd as the degree of inter-cylinder variation of the amount of fuel that is injected through the in-cylinder injector 17 increases, in a case where the cause of inter-cylinder variation is the in-cylinder injector 17. More specifically, a limiting process of limiting the port injection proportion Rp so as not to fall below a port lower limit value Bp is executed herein as an injection proportion reducing process of the in-cylinder injector 17. The greater the degree of inter-cylinder variation caused by the in-cylinder injector 17, the smaller is the value to which the port lower limit value Bp is set, and the smaller is as a result the in-cylinder injection proportion Rd.

Such limiting process of the injection proportion will be explained next with reference to FIG. 6 and FIG. 7. This process is repeatedly executed, by the control device 30, every predefined cycle. When the process is initiated, it is determined first whether learning of the in-cylinder imbalance ratio IMBd is complete or not, as illustrated in FIG. 6 (S200). Herein, learning of the in-cylinder imbalance ratio IMBd being complete refers to a state in which averaging of the in-cylinder imbalance ratio IMBd detected over multiple times is complete.

When learning of the in-cylinder imbalance ratio IMBd is not complete (NO in S200), the process is terminated temporarily. On the other hand, when learning of the in-cylinder imbalance ratio IMBd is complete (YES in S200), it is determined whether the in-cylinder imbalance ratio IMBd is equal to or greater than a determination value β or not (S210). As the determination value β there is set an in-cylinder imbalance ratio IMBd of a time at which the inter-cylinder variation for the amount of fuel that is injected through the in-cylinder injector 17 is large enough to influence exhaust emissions.

When the in-cylinder imbalance ratio IMBd is smaller than the determination value β (NO in S210), it is determined that the inter-cylinder variation of the in-cylinder injector 17 is not problematic, and the process is temporarily terminated.

On the other hand, when the in-cylinder imbalance ratio IMBd is equal to or greater than the determination value β (YES in S210), it is determined that the inter-cylinder variation for the in-cylinder injector 17 has become large to a certain extent. In the second embodiment, the in-cylinder injector 17 for which it is determined that the in-cylinder imbalance ratio IMBd is equal to or greater than the determination value β corresponds to the target injection valve above.

Next, the port lower limit value Bp is set based on the learned in-cylinder imbalance ratio IMBd (S220). The port lower limit value Bp is a value that is used when executing lower limit guarding of the port injection proportion Rp. When the port injection proportion Rp set based on engine operating state falls below the port lower limit value Bp, the value of the port injection proportion Rp is modified to the value of the port lower limit value Bp.

Figure 7:
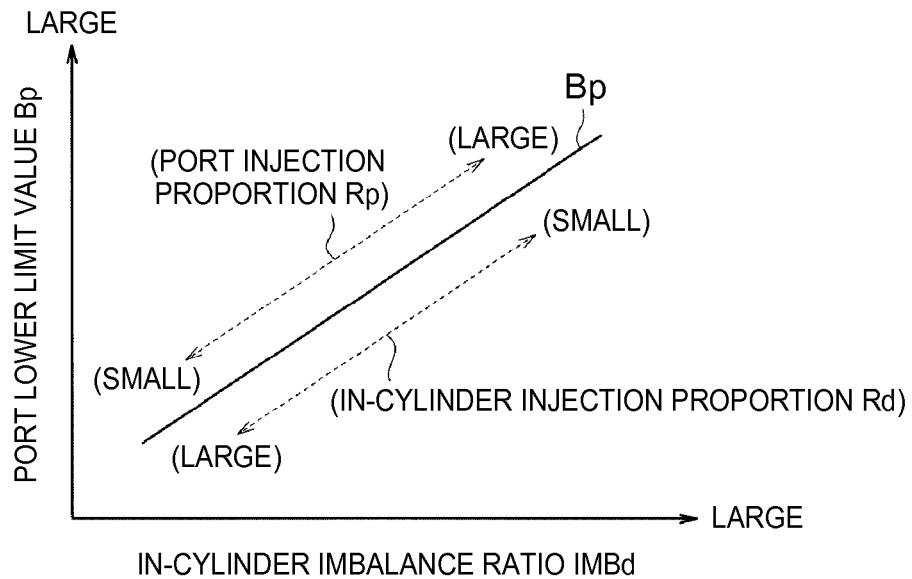
FIG. 7 is a graph illustrating a relationship between an in-cylinder imbalance ratio and a port lower limit value in the second embodiment.

As illustrated in FIG. 7, the port lower limit value Bp is variably set in accordance with the value of the in-cylinder imbalance ratio IMBd in such a manner that the greater the in-cylinder imbalance ratio IMBd, the greater the port lower limit value Bp is.

Next it is determined whether there is a split injection priority request or not (S230). This split injection priority request is identical to the split injection priority request explained in the first embodiment. When there is no split injection priority request (NO in S230), there is executed the above-described lower limit guarding of the port injection proportion Rp according to the port lower limit value Bp (S240), and the process is terminated temporarily.

On the other hand, when there is a split injection priority request (YES in S230), an injection proportion according to the split injection priority request is set, without executing lower limit guarding of the port injection proportion Rp according to the port lower limit value Bp (S250), and the process is terminated temporarily.

The effect of the above limiting process will be explained next. An instance will be explained first in which the in-cylinder injection proportion Rd is reduced using the port lower limit value Bp.

In a case where the injection proportion of the port injector 22 is limited in such a manner so as not to fall below the port lower limit value Bp (the port injector 22 being herein the other fuel injection valve that performs split injection along with the in-cylinder injector 17 for which the in-cylinder imbalance ratio IMBd is equal to or greater than the determination value β), the injection proportion of the in-cylinder injector 17 becomes smaller as the port lower limit value Bp is made greater.

In a case where, for instance, the port lower limit value Bp is set to "10%", there is a possibility that the injection proportion of "the fuel injection valve for which the in-cylinder imbalance ratio IMBd is equal to or greater than the determination value β", i.e. the in-cylinder injection proportion Rd, is set to "90%" at most. This brings about a state identical to that of an instance where the upper limit value of the in-cylinder injection proportion Rd is set to "90%". There is also a possibility that, in a case where the port lower limit value Bp is set to "20%", which is greater than "10%", the in-cylinder injection proportion Rd is set to "80%" at most. This brings about a state identical to that of an instance where the upper limit value of the in-cylinder injection proportion Rd is set to be smaller than the previous value (i.e. 90%).

As illustrated in FIG. 7, in a case where the port injection proportion Rp is limited so as not to fall below the port lower limit value Bp, the greater the port lower limit value Bp, the greater the port injection proportion Rp is, i.e. the smaller the in-cylinder injection proportion Rd is.

In a case of limiting, so as not to fall below a lower limit value, the injection proportion of the other fuel injection valve that performs split injection along with the fuel injection valve for which the degree of inter-cylinder variation is equal to or greater than the predefined value, increasing thus that lower limit value elicits an effect identical to that elicited by reducing the upper limit value for the injection proportion of the fuel injection valve for which the degree of inter-cylinder variation is equal to or greater than the predefined value, as explained below.

Figure 6:
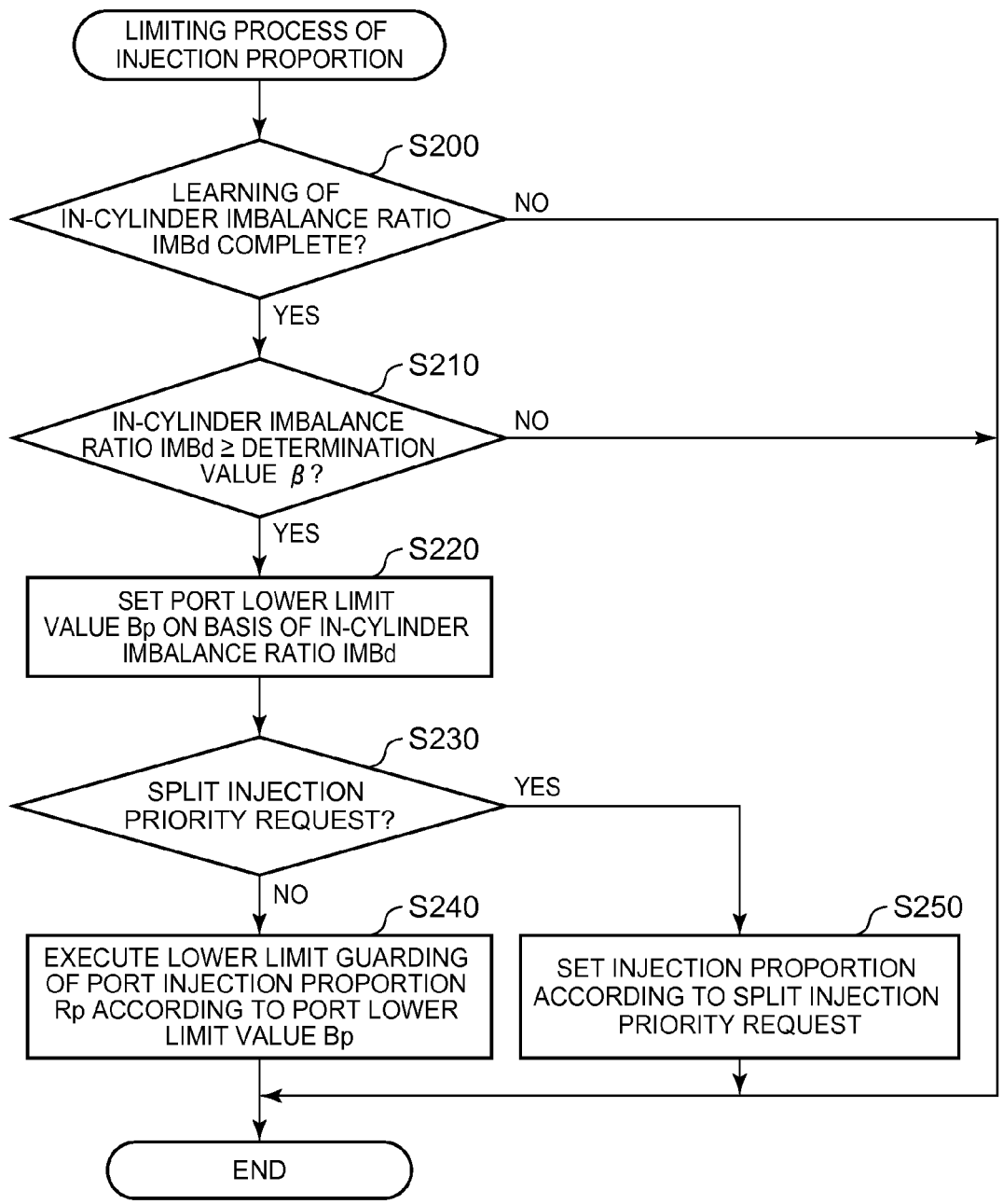
FIG. 6 is a flowchart illustrating a procedure of a limiting process of the injection proportion of an in-cylinder injector, being a process procedure that is executed in an internal combustion engine of a second embodiment of the invention.

Therefore, in a case where in the limiting process illustrated in FIG. 6 the in-cylinder imbalance ratio IMBd is equal to or greater than the determination value β, the greater the in-cylinder imbalance ratio IMBd, the greater the lower limit value is set to be with respect to the port injection proportion Rp. As a result, the greater the in-cylinder imbalance ratio IMBd, the smaller is the in-cylinder injection proportion Rd, and the more decreases the amount of fuel that is injected through the in-cylinder injector 17. As a result, an effect identical to that of the first embodiment is elicited for the inter-cylinder variation caused by the in-cylinder injector 17.

Specifically, in a case where the in-cylinder imbalance ratio IMBd is equal to or greater than the determination value β, the greater the amount of fuel that is injected through the in-cylinder injector 17, the greater is the influence of inter-cylinder variation on exhaust emissions. The influence of inter-cylinder variation on exhaust emissions is conversely small for a small amount of fuel injected through the in-cylinder injector 17 for which the in-cylinder imbalance ratio IMBd is equal to or greater than the determination value β. To satisfy the original request of split injection of fuel in a case where the in-cylinder imbalance ratio IMBd is equal to or greater than the determination value β, therefore, it is preferable to reduce the fuel injection amount injected through the in-cylinder injector 17 only when the fuel injection amount injected through the in-cylinder injector 17 is comparatively large.

Therefore, in a case where in the above limiting process the in-cylinder imbalance ratio IMBd is equal to or greater than the determination value β, a process is executed, in step S240, of limiting the injection proportion of the port injector 22 so as not to fall below the port lower limit value Bp. As a result it becomes possible to suppress injection of a significant amount of fuel in excess of (100%-"port lower limit value Bp"), through the in-cylinder injector 17 for which the inter-cylinder variation is equal to or greater than the determination value β.

As illustrated in FIG. 7, the port lower limit value Bp is set, in step S220, to a greater value as an in-cylinder imbalance ratio IMBd increases. Accordingly, the greater the value to which the port lower limit value Bp is set, the more readily is the lower limit of the port injection proportion Rp guarded according to the port lower limit value Bp, and the greater is also the value of the port injection proportion Rp after having undergone lower limit guarding, as illustrated in FIG. 7. Therefore, the greater the in-cylinder imbalance ratio IMBd that denotes the degree of inter-cylinder variation of the in-cylinder injector 17, the smaller is the in-cylinder injection proportion Rd, in a manner opposing an increase in the port injection proportion Rp. Accordingly, there decreases the amount of fuel injected through the in-cylinder injector 17 for which the in-cylinder imbalance ratio IMBd is equal to or greater than the determination value β.

In a case where the in-cylinder imbalance ratio IMBd is equal to or greater than the determination value β, thus, the amount of fuel that is injected through the in-cylinder injector 17 is reduced as the degree of inter-cylinder variation increases. Therefore, the variation in the fuel injection amount among cylinders decreases, and, as a result, there is suppressed worsening of emissions derived from variation in the fuel injection amount among cylinders.

Although the injection proportion of the in-cylinder injector 17 for which inter-cylinder variation occurs is reduced in accordance with the degree of inter-cylinder variation, fuel injection itself through the in-cylinder injector 17 is not prohibited. As a result, large deviations from the original request of split injection of fuel are further suppressed, as compared with an instance where there is prohibited the use itself of the in-cylinder injector 17 for which inter-cylinder variation occurs. It becomes therefore possible to curtail, as much as possible, decline in the effect elicited by split injection of fuel.

As explained above, the second embodiment elicits the following effects. (1) In a case where the in-cylinder imbalance ratio IMBd that denotes the degree of inter-cylinder variation of the in-cylinder injector 17 is equal to or greater than the determination value β and exhaust emissions are influenced by inter-cylinder variation, the in-cylinder injection proportion Rd is set to be smaller as the in-cylinder imbalance ratio IMBd increases. Therefore, the variation in the fuel injection amount among cylinders decreases, and, as a result, there is suppressed worsening of emissions derived from variation in the fuel injection amount among cylinders. Further, large deviations from the original request of split injection of fuel are further suppressed, as compared with an instance where the use of the in-cylinder injector 17 is prohibited. It becomes therefore possible to curtail, as much as possible, decline in the effect of split injection at a time of execution of split injection of fuel by the port injector 22 and the in-cylinder injector 17.

(2) When the in-cylinder imbalance ratio IMBd is equal to or greater than the determination value β, a lower limit guarding process is executed of limiting the injection proportion of the port injector 22, which performs split injection along with the in-cylinder injector, so as not to fall below the port lower limit value Bp. As a result, it becomes possible to suppress adverse occurrences, such as worsening of exhaust emissions, through injection of a significant amount of fuel through the in-cylinder injector 17 for which the in-cylinder imbalance ratio IMBd is equal to or greater than the determination value β, as described above. The greater the in-cylinder imbalance ratio IMBd, the greater is the value to which the port lower limit value Bp. It becomes therefore possible to make the in-cylinder injection proportion Rd smaller, as described above, as the degree of inter-cylinder variation of the in-cylinder injector 17 increases.

The above embodiments can be implemented in the form of the below-described modifications.

In the first embodiment, the greater the port imbalance ratio IMBp, the smaller was the value to which the port upper limit value Ap was set, so that the port injection proportion Rp was smaller as a result. In addition, in a case of limiting, so as not to fall below a lower limit value, the injection proportion of the other fuel injection valve that performs split injection along with the fuel injection valve for which the degree of inter-cylinder variation is equal to or greater than the predefined value, as explained in the second embodiment, increasing that lower limit value elicits an effect identical to that elicited by reducing the upper limit value for the injection proportion of the fuel injection valve for which the degree of inter-cylinder variation is equal to or greater than the predefined value. Therefore, a configuration may be adopted that involves executing a process of limiting the in-cylinder injection proportion Rd so as not to fall below the in-cylinder lower limit value Bd, and variably setting the in-cylinder lower limit value Bd in accordance with the port imbalance ratio IMBp.

Figure 8:
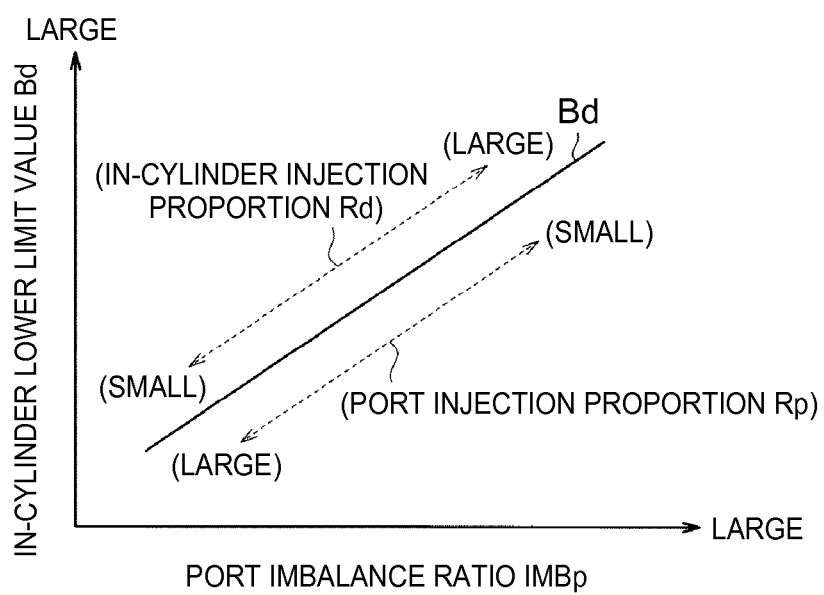
FIG. 8 is a graph illustrating the relationship between a port imbalance ratio and an in-cylinder lower limit value in a first variation of an embodiment of the invention.

Accordingly, a first variation of the embodiment in such a case will be explained next. FIG. 8 illustrates a setting mode of the in-cylinder lower limit value Bd in a first variation. As illustrated in FIG. 8, the in-cylinder lower limit value Bd is variably set in such a manner that the in-cylinder lower limit value Bd increases as the port imbalance ratio IMBp increases. In this first variation, the greater the port imbalance ratio IMBp, the greater the in-cylinder injection proportion Rd is, and, contrarily thereto, the smaller the port injection proportion Rp is. Therefore, the first variation as well elicits the same effects as those of the first embodiment.

In the second embodiment, the greater the in-cylinder imbalance ratio IMBd was, the greater the value to which the port lower limit value Bp was set, so that the in-cylinder injection proportion Rd became smaller as a result. Alternatively, a configuration may be adopted wherein the greater the in-cylinder imbalance ratio IMBd, the smaller the in-cylinder injection proportion Rd is, in a manner conforming to the first embodiment. For instance, a configuration may be adopted that involves executing a process of limiting the in-cylinder injection proportion Rd so as not to exceed an in-cylinder upper limit value Ad, and variably setting the in-cylinder upper limit value Ad in accordance with the in-cylinder imbalance ratio IMBd.

Figure 9:
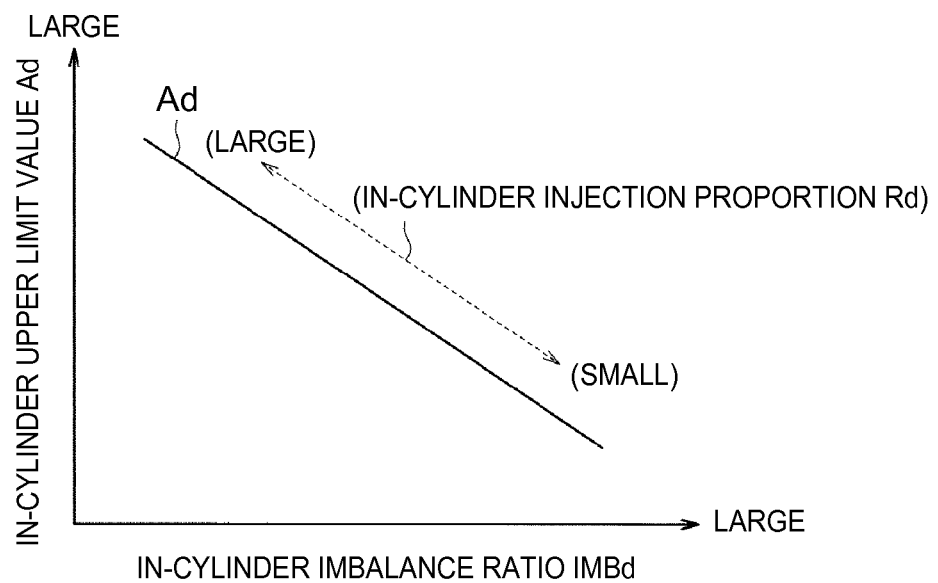
FIG. 9 is a graph illustrating a relationship between an in-cylinder imbalance ratio and an in-cylinder upper limit value in a second variation of an embodiment of the invention.

Accordingly, a second variation of the embodiment in such a case will be explained next. FIG. 9 illustrates a setting mode of the in-cylinder upper limit value Ad in a second variation. As illustrated in FIG. 9, the in-cylinder upper limit value Ad is variably set in such a manner that the greater the in-cylinder imbalance ratio IMBd, the smaller the in-cylinder upper limit value Ad is. According to this second variation, the greater the in-cylinder imbalance ratio IMBd, the smaller the in-cylinder injection proportion Rd is. Therefore, the second variation as well elicits the same effects as those of the second embodiment.

As the injection proportion reducing process in the first embodiment and the second embodiment, an upper limit value or lower limit value that limits the injection proportion was modified in accordance with an imbalance ratio IMB. As the injection proportion reducing process, alternatively, an injection proportion reducing process may be resorted to that involves executing downward correction of making smaller the injection proportion of the fuel injection valve as the degree of inter-cylinder variation of the fuel injection valve increases. Specifically, the injection proportion reducing process of reducing the injection proportion of the fuel injection valve, i.e. the port injector 22 or the in-cylinder injector 17, is not limited to restricting, to a predefined or smaller value, the injection proportion of the fuel injection valve for which the degree of inter-cylinder variation is equal to or greater than the predefined value, and may involve reducing the injection proportion by a predefined amount.

Figure 10:
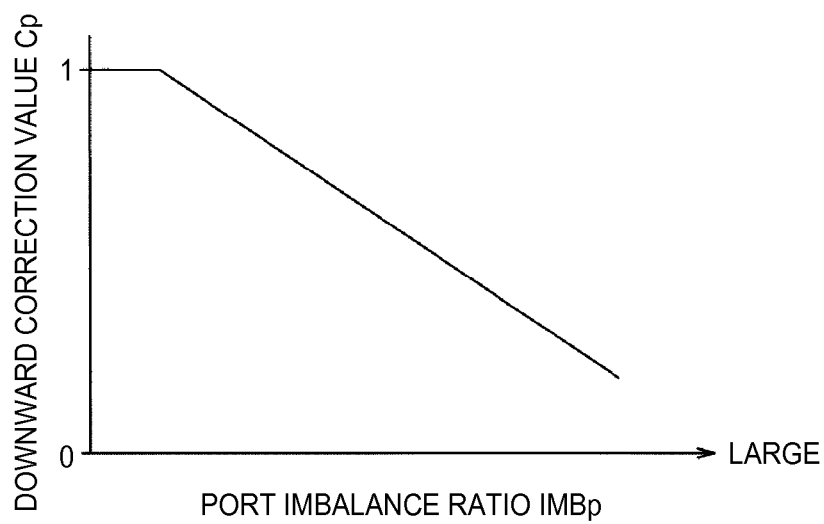
FIG. 10 is a graph illustrating a relationship between a port imbalance ratio and a downward correction value in a third variation of an embodiment of the invention.

Accordingly, a third variation, as an example of a variation of the embodiment in such a case, will be explained next. FIG. 10 illustrates a setting mode of a downward correction value Cp by which the port injection proportion Rp is multiplied in a third variation. The downward correction value Cp is a value for downward correction of the port injection proportion Rp that is set based on the engine operating state, the downward correction value Cp being variably set within a range "$0<Cp \leq 1$". The downward correction value Cp is set to "1" in a case where the port imbalance ratio IMBp is comparatively small and the injection proportion need not be modified. On the other hand, when the port imbalance ratio IMBp is large to a certain extent and the injection proportion needs to be modified, the downward correction value Cp is variably set so as to take on a smaller value as the port imbalance ratio IMBp increases. In the third variation as well, the injection proportion of the port injector 22 can be made smaller as the degree of inter-cylinder variation of the port injector 22 increases.

A configuration may also be adopted that involves downward correction of the port injection proportion Rp through setting of a subtraction value, and not a multiplication value, for the port injection proportion Rp. In a similar manner, a configuration may be adopted, in a case where the in-cylinder injector 17 is the target, that involves downwardly correcting the in-cylinder injection proportion Rd that is set based on the engine operating state, and making greater the decrement of the in-cylinder injection proportion Rd, by that downward correction, as the in-cylinder imbalance ratio IMBd increases.

When performing split injection of fuel by the port injector 22 and the in-cylinder injector 17, increasing the injection proportion of one of the injectors is synonymous with reducing the injection proportion of the other injector. As the above injection proportion reducing process, thus, there is executed upward correction of increasing the injection proportion of the other fuel injection valve that performs split injection along with the fuel injection valve for which the degree of inter-cylinder variation is equal to or greater than the predefined value. Even if the degree of increment of injection proportion by the upward correction is set to be greater as the degree of inter-cylinder variation of the fuel injection valve, for which the degree of inter-cylinder variation is equal to or greater than the predefined value, increases, it becomes thus possible to make smaller the injection proportion of the fuel injection valve as the degree of inter-cylinder variation of the fuel injection valve, for which the degree of inter-cylinder variation is equal to or greater than the predefined value, increases. Upward correction herein may be executed in a manner similar to that of the downward correction above. Specifically, upward correction may be executed by multiplying the injection proportion of the other one of the injection valves by an upward correction value. Alternatively, the upward correction may be executed by adding an increment to the target injection proportion of the target injection valve.

Figure 11:
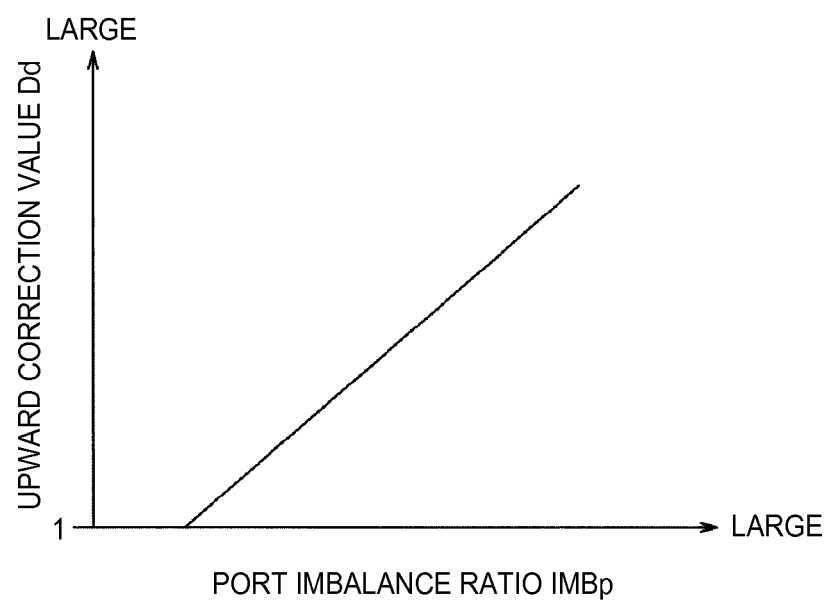
FIG. 11 is a graph illustrating a relationship between a port imbalance ratio and an upward correction value in a fourth variation of an embodiment of the invention.

Accordingly, a fourth variation, as an example of a variation of the embodiment in such a case, will be explained next. FIG. 11 illustrates a setting mode of an upward correction value Dd by which the in-cylinder injection proportion Rd is multiplied in a fourth variation. The upward correction value Dd is a value for upward correction of the in-cylinder injection proportion Rd that is set based on the engine operating state, the upward correction value Dd being variably set within a range "$Dd \geq 1$". The upward correction value Dd is set to "1" in a case where the port imbalance ratio IMBp is comparatively small and the injection proportion need not be modified. On the other hand, when the port imbalance ratio IMBp is large to a certain extent and the injection proportion needs to be modified, the upward correction value Dd is variably set so as to take on a greater value as the port imbalance ratio IMBp increases. Thus, when the upward correction value Dd is variably set to take on a greater value as the port imbalance ratio IMBp increases, the in-cylinder injection proportion Rd increases, and contrarily thereto, the port injection proportion Rp decreases as the port imbalance ratio IMBp increases. In the fourth variation as well, therefore, the injection proportion of the port injector 22 can be made smaller as the degree of inter-cylinder variation of the port injector 22 increases.

A configuration may be adopted that involves downward correction of the port injection proportion Rp through upward correction of the in-cylinder injection proportion Rd by setting an addition value, and not a multiplication value for the in-cylinder injection proportion Rd. In a similar manner, a configuration may be adopted, in a case where the in-cylinder injector 17 is the target, that involves upwardly correcting the port injection proportion Rp that is set based on the engine operating state, and making greater the degree of increment of the port injection proportion Rp, by the upward correction, as the in-cylinder imbalance ratio IMBd increases.

In the limiting process illustrated in FIG. 4, the presence or absence of a split injection request is determined in step S130, but the process of step S130 and the process of step S150 may be omitted.

In the limiting process illustrated in FIG. 6, similarly, the presence or absence of a split injection request is determined in step S230, but the process of step S230 and the process of step S250 may be omitted.

In the first embodiment, the port upper limit value Ap was variably set in accordance with the port imbalance ratio IMBp. Alternatively, a configuration may be adopted wherein, when the port imbalance ratio IMBp is equal to or greater than a value established beforehand, a fixed value, being a constant value smaller than the value that is set when the port imbalance ratio IMBp does not satisfy the value established beforehand, is set as the port upper limit value Ap.

In the second embodiment, similarly, the port lower limit value Bp was variably set in accordance with the in-cylinder imbalance ratio IMBd. Alternatively, a configuration may be adopted wherein, when the in-cylinder imbalance ratio IMBd is equal to or greater than a value established beforehand, a fixed value, being a constant value greater than the value that is set when the in-cylinder imbalance ratio IMBd does not satisfy the value established beforehand, is set as the port lower limit value Bp.

A configuration may be adopted that involves setting the in-cylinder imbalance ratio IMBd as the determination value α in step S110 illustrated in FIG. 4. In this case, the port injection proportion Rp can be reduced in an instance where the degree of inter-cylinder variation of the port injector 22 is equal to or greater than the degree of inter-cylinder variation of the in-cylinder injector 17. Likewise, a configuration may be adopted that involves setting the port imbalance ratio IMBp as the determination value β in step S210 illustrated in FIG. 6. In this case, the in-cylinder injection proportion Rd can be reduced in an instance where the degree of inter-cylinder variation of the in-cylinder injector 17 is equal to or greater than the degree of inter-cylinder variation of port injector 22.

The embodiment and the alternative embodiments described above are illustrative and not restrictive in all respects. The scope of the invention is defined by not only the above description but also the appended claims. The scope of the invention is intended to encompass all modifications within the scope of the appended claims and the meaning and scope of equivalents thereof.

What is claimed is:

1. An internal combustion engine, comprising:
    an intake port fuel injection valve provided in each of a plurality of cylinders of the internal combustion engine, the intake port fuel injection valve being configured to inject fuel into an intake port of the internal combustion engine;
    an in-cylinder fuel injection valve provided in each of the plurality of cylinders of the internal combustion engine, the in-cylinder fuel injection valve being configured to inject fuel into a fuel combustion chamber of the internal combustion engine; and
    an electronic control unit configured to:
    (i) perform split injection of fuel by the intake port fuel injection valve and the in-cylinder fuel injection valve by modifying, in accordance with an engine operating state, an injection proportion of fuel that is injected through each of the intake port fuel injection valves and the in-cylinder fuel injection valves,
    (ii) detect a degree of inter-cylinder variation in an amount of fuel injected through the intake port fuel injection valve and a degree of inter-cylinder variation in an amount of fuel injected through the in-cylinder fuel injection valve,
    (iii) determine, in a case where one of the degree of inter-cylinder variation detected for the intake port fuel injection valve and the degree of inter-cylinder variation detected for the in-cylinder fuel injection valve is equal to or greater than a predefined value, the one of the intake port fuel injection valve and the in-cylinder fuel injection valve, for which determination has been made that the degree of inter-cylinder variation is equal to or greater than the predefined value, as a target injection valve,
    (iv) calculate a target injection proportion of the target injection valve to be smaller as the degree of inter-cylinder variation of the target injection valve increases,
    (v) calculate the injection proportion of fuel from the intake port fuel injection valves based on the target injection proportion calculated for the target injection valve and calculate the injection proportion of fuel from the in-cylinder fuel injection valves based on the target injection proportion calculated for the target injection valve, and
    (vi) execute split injection of fuel from the intake port fuel injection valves based on the calculated injection proportion of fuel from the intake port fuel injection valves and from the in-cylinder fuel injection valves based on the calculated injection proportion of fuel from the in-cylinder fuel injection valves.

2. The internal combustion engine according to claim 1, wherein
    the electronic control unit is configured to:
    (i) limit the target injection proportion of the target injection valve so as not to exceed an upper limit value, and
    (ii) set the upper limit value to a smaller value as the degree of inter-cylinder variation of the target injection valve increases.

3. The internal combustion engine according to claim 1, wherein
    the electronic control unit is configured to:
    (i) limit the injection proportion of the other one of the intake port fuel injection valve and the in-cylinder fuel injection valve that performs split injection along with the target injection valve, so as not to fall below a lower limit value, and
    (ii) set the lower limit value to a greater value as the degree of inter-cylinder variation of the target injection valve increases.

4. The internal combustion engine according to claim 1, wherein
    the electronic control unit is configured to execute downward correction of making the target injection proportion of the target injection valve smaller as the degree of inter-cylinder variation of the target injection valve increases, without limiting the target injection proportion of the target injection valve so as not to exceed an upper limit value.

5. The internal combustion engine according to claim 4, wherein
    the electronic control unit is configured to execute the downward correction by multiplying the target injection proportion of the target injection valve by a downward correction value.

6. The internal combustion engine according to claim 4, wherein
    the electronic control unit is configured to execute by subtracting a subtraction value from the target injection proportion of the target injection valve.

7. The internal combustion engine according to claim 1, wherein
    the electronic control unit is configured to execute upward correction of making greater the injection proportion of the other one of the intake port fuel injection valve and the in-cylinder fuel injection valve that performs split injection along with the target injection valve as the degree of inter-cylinder variation of the target injection valve increases, without limiting the injection proportion of the other one of the intake port fuel injection valve and the in-cylinder fuel injection valve so as not to fall below a lower limit value.

8. The internal combustion engine according to claim 7, wherein
the electronic control unit is configured to execute the upward correction by multiplying the injection proportion of the other one of the intake port fuel injection valve and the in-cylinder fuel injection valve by an upward correction value.

9. The internal combustion engine according to claim 7, wherein
the electronic control unit is configured to execute the upward correction by adding an increment to the injection proportion of the other one of the intake port fuel injection valve and the in-cylinder fuel injection valve.

10. An internal combustion engine, comprising:
an intake port fuel injection valve provided in each of a plurality of cylinders of the internal combustion engine, the intake port fuel injection valve being configured to inject fuel into an intake port of the internal combustion engine;
an in-cylinder fuel injection valve provided in each of the plurality of cylinders of the internal combustion engine, the in-cylinder fuel injection valve being configured to inject fuel into a fuel combustion chamber of the internal combustion engine; and
an electronic control unit configured to:
(i) perform split injection of fuel by the intake port fuel injection valve and the in-cylinder fuel injection valve by modifying, in accordance with an engine operating state, an injection proportion of fuel that is injected through each of the intake port fuel injection valves and the in-cylinder fuel injection valves,
(ii) detect a degree of inter-cylinder variation in an amount of fuel injected through the intake port fuel injection valve and a degree of inter-cylinder variation in an amount of fuel injected through the in-cylinder fuel injection valve,
(iii) determine, in a case where one of the degree of inter-cylinder variation detected for the intake port fuel injection valve and the degree of inter-cylinder variation detected for the in-cylinder fuel injection valve is equal to or greater than a predefined value, the one of the intake port fuel injection valve and the in-cylinder fuel injection valve, for which determination has been made that the degree of inter-cylinder variation is equal to or greater than the predefined value, as a target injection valve,
(iv) set a target injection proportion of the target injection valve to be smaller as the degree of inter-cylinder variation of the target injection valve increases,
(v) set each injection proportion of fuel from each of the intake port fuel injection valves and the in-cylinder fuel injection valves, based on the target injection proportion set for the target injection valve,
(vi) execute split injection of fuel from each of the intake port fuel injection valves and the in-cylinder fuel injection valves, based on each injection proportion that has been set,
(vii) limit the target injection proportion of the target injection valve so as not to exceed an upper limit value, and
(viii) set the upper limit value to a smaller value as the degree of inter-cylinder variation of the target injection valve increases.

11. An internal combustion engine, comprising:
an intake port fuel injection valve provided in each of a plurality of cylinders of the internal combustion engine, the intake port fuel injection valve being configured to inject fuel into an intake port of the internal combustion engine;
an in-cylinder fuel injection valve provided in each of the plurality of cylinders of the internal combustion engine, the in-cylinder fuel injection valve being configured to inject fuel into a fuel combustion chamber of the internal combustion engine; and
an electronic control unit configured to:
(i) perform split injection of fuel by the intake port fuel injection valve and the in-cylinder fuel injection valve by modifying, in accordance with an engine operating state, an injection proportion of fuel that is injected through each of the intake port fuel injection valves and the in-cylinder fuel injection valves,
(ii) detect a degree of inter-cylinder variation in an amount of fuel injected through the intake port fuel injection valve and a degree of inter-cylinder variation in an amount of fuel injected through the in-cylinder fuel injection valve,
(iii) determine, in a case where one of the degree of inter-cylinder variation detected for the intake port fuel injection valve and the degree of inter-cylinder variation detected for the in-cylinder fuel injection valve is equal to or greater than a predefined value, the one of the intake port fuel injection valve and the in-cylinder fuel injection valve, for which determination has been made that the degree of inter-cylinder variation is equal to or greater than the predefined value, as a target injection valve,
(iv) set a target injection proportion of the target injection valve to be smaller as the degree of inter-cylinder variation of the target injection valve increases,
(v) set each injection proportion of fuel from each of the intake port fuel injection valves and the in-cylinder fuel injection valves, based on the target injection proportion set for the target injection valve,
(vi) execute split injection of fuel from each of the intake port fuel injection valves and the in-cylinder fuel injection valves, based on each injection proportion that has been set,
(vii) limit the injection proportion of the other one of the intake port fuel injection valve and the in-cylinder fuel injection valve that performs split injection along with the target injection valve, so as not to fall below a lower limit value, and
(viii) set the lower limit value to a greater value as the degree of inter-cylinder variation of the target injection valve increases.

* * * * *